Feb. 26, 1957 J. W. ANDERSON 2,782,448
WINDSHIELD WIPER BLADE ASSEMBLIES
Original Filed Jan. 14, 1948
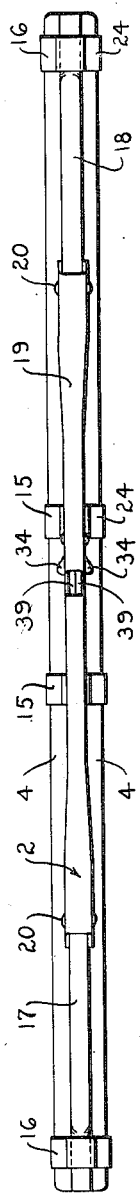
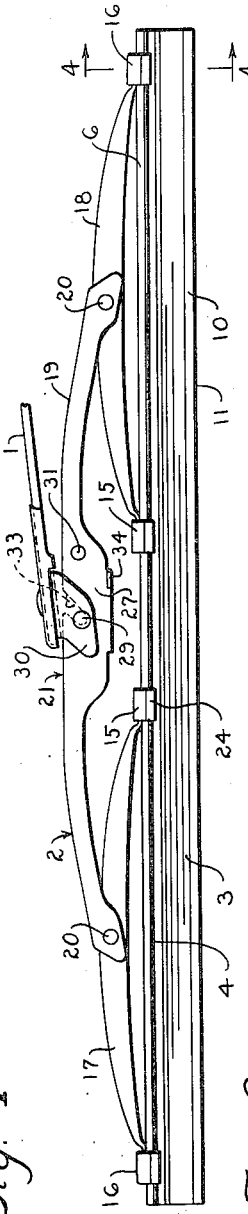
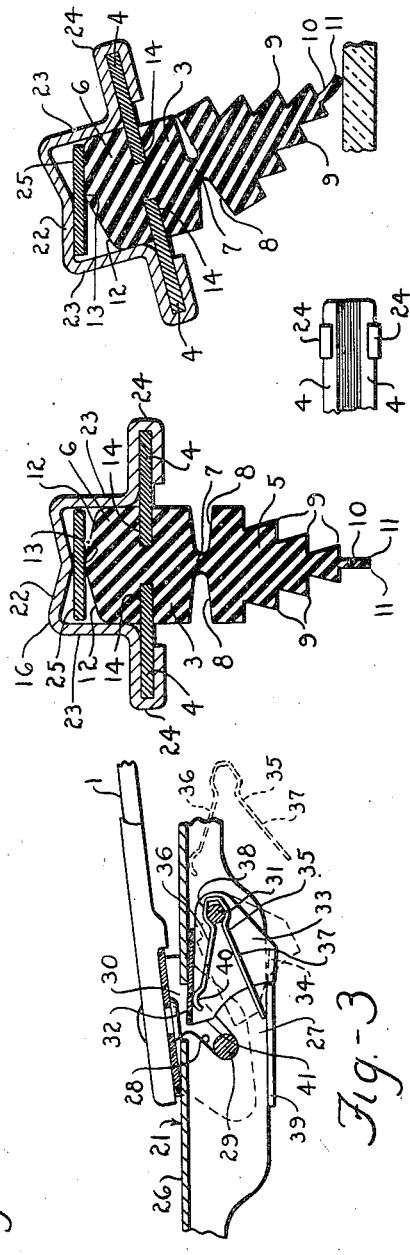
INVENTOR.
JOHN W. ANDERSON
BY
Charles S. Penfold
ATTORNEY United States Patent Office 2,782,448
Patented Feb. 26, 1957

2,782,448

WINDSHIELD WIPER BLADE ASSEMBLIES

John W. Anderson, Gary, Ind., assignor to Productive Inventions, Inc., a corporation of Indiana Continuation of applications Serial No. 2,258, January 14, 1948, and Serial No. 293,549, June 14, 1952. This application March 21, 1956, Serial No. 573,012

12 Claims. (Cl. 15—245)

This invention relates generally to windshield or window cleaners or wiper devices and more particularly is directed to a device adapted to clean or wipe a curved surface as well as a substantially plane surface, and is related to a similar device shown in the application of John W. Anderson, Serial No. 634,730 filed December 13, 1945, for Windshield Wiper Blade Linkage Assembly, now Patent No. 2,596,063, and devices shown in his copending applications Serial No. 634,729 filed December 13, 1945, for Windshield Cleaner and Serial No. 766,956 filed August 7, 1947, for Windshield Wiper Blade and Carriage Assemblies. The claims in application Serial No. 634,729 are directed to a novel blade unit and a pressure unit preferably in the form of a yoke connected to the blade unit. The claims in application Serial No. 766,956 are addressed to a sliding arrangement between a resiliently flexible blade unit and pressure unit with means to permit separation of the units. The latch means exemplified in Figure 3 of the subject application is claimed in Patent No. 2,548,090.

This application is a continuation of my copending applications Serial No. 2,258 filed January 14, 1948, and Serial No. 293,549 filed June 14, 1952.

The primary object of the present invention is to provide a cleaning device in the class above mentioned which embodies improved principles of design and construction facilitating replacement of the resilient wiping element when it becomes worn or damaged.

A further object of the invention is to provide a construction and arrangement of parts and assemblies which will permit, under all operating conditions, a substantially uniform transmission and distribution of the pressure of the wiper arm throughout the length of the wiping edge of the resilient element designed to contact the glass.

A further object of the invention is to provide a wiper assembly in which the friction encountered in flexing the wiping element to accommodate irregularities in the surface to be wiped is reduced to a minimum to facilitate such flexing in order that a better wiping result may be achieved.

A further object of the invention is to provide a construction and arrangement of parts which will permit, without the use of tools, the ready replacement of the resilient wiping element embodied therein, in order that a minimum of time may be required for such replacements, which replacements are made usually on busy drives of gasoline service stations under conditions where the car owner and the station attendant each are desirous of shortening the time required for the service operation.

A further object of the invention is to provide a design and arrangement of parts which will facilitate the manufacture of the parts and will facilitate their assembly, in the manufacture of the complete assembly, in the manufacture of subassemblies thereof, and in the manufacture of replacement or refill assemblies as will be hereinafter described.

A further object of the invention is to provide a construction and arrangement of parts which will permit the employment of the reactive force of a portion of the resilient wiping element, after being subjected to compression for the purpose, in the locking in connection therewith of a clip serving to hold the parts of said assembly in correct operative relationship. By so employing such reactive force, the necessity for separate springs or other resilient members is avoided, the manufacture and use of the invention are facilitated, and its cost of manufacture is reduced.

A further object of the invention is to provide a complete wiper blade assembly comprised of a wiper blade unit and a linkage or carriage unit, and means whereby the units may slide, yield, and pivot with respect to one another.

A further object of the invention is to provide simple and effective means by which the complete assembly may be locked securely to means employed for driving the assembly, said locking means being so constructed and arranged as to permit manual removal of said assembly from said driving means.

Another object of the invention is to provide a design and construction of parts and assemblies which will minimize the width of the device and thereby minimize its obstruction to vision.

Other objects and advantages of the invention will become evident after considering the description hereinafter set forth in conjunction with the drawings annexed hereto.

In the drawings,

Figure 1 is a top view of the complete assembly;

Figure 2 is a side view in elevation of the assembly illustrated in Figure 1, including a part of a particular type of wiper arm, with the parts thereof shown in their relative positions when the assembly is applied to a windshield having a substantially planar surface;

Figure 3 is an enlarged view illustrating the assembled connection between a part of the complete assembly and a wiper arm, portions of which are broken away for the purpose of clearly illustrating the locking means;

Figure 4 is an enlarged transverse section taken substantially on line 4—4 of Figure 2;

Figure 5 is a section of one end of the assembly as viewed from the underside; and Figure 6 is a section similar to Figure 4 showing the relative positions of certain parts of the assembly when actuated.

Referring to Figure 2 of the drawing, numeral 1 designates the outer extremity of a conventional wiper arm supporting a complete wiper blade assembly generally designated 2 in a manner to press the wiper means or wiping element 3 either against a substantially planar surface or a curved surface to be cleaned. The element 3 is secured to spring-like holder means or support preferably comprised of a pair of corresponding members 4 constituting stay means, the element and support constituting a blade unit constructed to normally assume a substantially straight condition as exemplified in Figure 2. The word "substantially" as herein used is intended to include a construction in which the wiper blade assembly may be either normally straight and/or slightly curved. Also, the term "wiper element" as used in the claims is intended to cover various forms or types of material such as rubber or the equivalent, comprised of one or a plurality of members.

More specifically, element 3 is constructed of some desirable resilient material such as rubber and preferably includes a wiper head portion 5, generally triangular in cross-section, and an attaching portion 6, generally rectangular in cross-section, which portions are pivotally joined together by a reduced or neck portion 7. Stated otherwise, the sides of the element are interrupted by a pair of oppositely disposed longitudinally extending corresponding recesses or grooves 8 to provide pivotally connected parts or portions. The reduced portion 7 permits the wiper head 5 to yield or pivot with respect to the portion 6 at the beginning of each stroke of the wiper means as it travels back and forth over the windshield glass.

The triangular wiper head 5 is provided with a plurality of wiping edges or arrises 9 and a lip 10, the latter having wiping edges 11, which are adapted to alternately engage the glass. Certain of the auxiliary wiping edges 9 may also be caused to engage and clean the glass, depending upon the pressure applied to the wiper arm and the resistance of extraneous matter encountered on the glass. It is to be understood that the wiping portion as well as the attaching portion of the wiper blade unit may be constructed otherwise than illustrated. For example, the wiping head may be entirely eliminated, in which event the neck portion 7 would be of a desirable size and provided with wiping edges corresponding to the edges 11 whereby to accomplish the result comprehended by the invention. Furthermore, the blade unit or assembly may be comprised of a plurality of plies or laminations of rubber or the equivalent, and if desired these may be bonded or otherwise secured to a holder or backing, whether substantially rigid or flexible in character.

The wiper element 3 and its support or supporting means are preferably connected together by an interlocking arrangement. As clearly illustrated in Figures 4 and 6, the upper part of the wiper element is formed to include a pair of corresponding inclined surfaces constituting resilient abutments 12 and an intermediate high point or crest constituting a resilient bearing 13. The marginal side walls of the attaching portion 6 of the wiper element are interrupted by a pair of oppositely disposed longitudinally extending corresponding grooves or recesses 14 which receive the corresponding flexible members or strips 4 constituting the support for the resilient wiping element. These strips are preferably constructed of relatively thin metal strip stock, but may be made from any material suitable for the purpose. In certain applications of the invention, it may be considered advantageous to construct the holder or support in one piece. The wiper element and holder may be assembled as desired but the preferred method is to insert the strips 4 into the grooves 14, the reduced portion or neck resulting from the grooves being disposed between such strips. The strips may then be secured together in spaced apart parallel relation by an inner pair of corresponding fastening means 15 preferably disposed adjacent to the center of the wiper unit, and an outer pair of corresponding fastening means 16 preferably disposed adjacent the extremities of the wiper unit. It should be noted that since the strips comprising the holder are identical in character they may be easily and quickly assembled with the wiping element, without selectively positioning such parts for assembly, this factor being of considerable importance from the standpoint of speeding up assembly operations and reducing the assembly costs.

The carriage or linkage assembly, above referred to and clearly illustrated in Figure 2, serves to support the wiper unit and distribute the desired pressures thereagainst in accordance with the objects of the invention. This assembly includes a pair of corresponding elongated links 17 and 18 constituting secondary yokes, and a bridge member 19 constituting a primary yoke. More particularly in this respect, the outer end of the link 17 is preferably connected adjacent to one extremity of the support by one of the fasteners 16 and its inner end is similarly connected to the support by one of the fasteners 15 at a point spaced longitudinally inwardly from the first point of connection. The ends of the other link 18 are also similarly connected to the support by the other fasteners. The opposite extremities of the elongated bridge means 19 are preferably pivotally connected to intermediate portions of the links by means of pivots 20 which extend through the parts. The bridge means is provided with connection means 21 whereby the wiper unit may be detachably connected to the free end of a wiper arm. This connection means 21 will be described more in detail subsequently.

The pairs of fastening means 15 and 16, as illustrated in Figures 4 and 6, are substantially identical in character and accordingly, a description of one is deemed sufficient. Each preferably includes a re-entrant substantially V-shaped top wall portion 22 which overlies the upper surface of the attaching portion 6 of the wiping element, side walls 23 which in some measure engage and compress the sides of said attaching portion to prevent relative longitudinal movement between the wiping element and its support, and offset U-shaped formations or ears 24 which receive the strips 4. The U-shaped formations or ears 24 on the fastening means may be connected to the strips in any desirable manner but are preferably adapted to be pressed down against the strips as clearly illustrated in Figure 4. Although the ears on both pairs of fastening means are constructed so that the fastening means may be shifted longitudinally and frictionally held in any position desired, the arrangement is preferably such that the ears 24 on one of the inner fastening means 15 and the ears on the outer fastening means 16 farthest therefrom are relatively firmly anchored in place, whereas the other means 15 and 16 may be more easily shifted longitudinally and frictionally held in any position desired. This shifting or adjustment, particularly of the fastening means described, enables the substantially flat end portions 25 of elongated links or yokes 17 and 18 of the carriage assembly to be manually released from all of such means. Those fastening means adapted for longitudinal adjustment are preferably resiliently held in place by the reactive force of the wiping element. There is thus presented an arrangement whereby when the wiper blade unit becomes worn or damaged, the same may be easily removed and a new one assembled with the linkage assembly. It is also apparent that separation of the wiping element from its support can be readily accomplished by removing the fastening means 15 and 16. It is to be understood that other fastening means suitable for this purpose may be employed and that they may be secured to the holder or support in ways different from the one just described.

Other forms of fastening means, locking means or abutment means are disclosed in my copending applications Serial Numbers 612,542 and 404,279 now abandoned; and in the copending applications of Fred A. Krohm, Serial Numbers 297,098, 334,157, and 341,051.

As exemplified in Figure 6 of the drawing, when the wiper blade unit is directed back and forth across a surface to be cleaned, the wiper head portion 5 will be caused to pivot relative to the attaching portion 6 due to the provision of the connecting neck portion 7 and the clearance recesses or grooves 8. It will be evident that relative movement also takes place between the links and the wiper unit. More specifically in this respect, the outer substantially flat extremities 25 of the links or yokes 17 and 18 are adapted to alternately rock on the resilient abutments 12 and the sides of the V of the re-entrant portion 22 of the wiper element and fastening means, respectively. The sides of the V and the abutments 12 in effect provide generally triangular spaces for operation of the extremities 25 about the bearing crest 13 of the wiper element and the point of the re-entrant portion within the confines of the fastening means. The arrangement is such that the wiper unit may slide as well as pivot relative to the links, yet controlled sufficiently to provide that freedom of flexibility necessary for effective performance under varying conditions. The arrangement is also practically noiseless, due to the fact that the links are pressed against the attaching portion 6 of the wiper element. Since the attaching portion 6 is compressed to some extent by the force of the wiper arm applied to the links, such portion will react and assist in some measure to effect the relative movement referred to.

Referring again to the linkage assembly, it will be noted that the links and the bridge means are made preferably slightly bowed or arcuate in shape in order to provide sufficient clearances for the outward flexing or bending of those portions of the holder and wiping element intermediate the points of connection between the links and the wiper unit when such unit is applied to a curved surface. It is also to be noted that the links and bridge means are preferably channel-shape in form so as to impart rigidity thereto and so that the enlarged channel extremities of the bridge means will receive the links. Sufficient bearings or abutting surfaces are provided between the fastening means, links, and bridge to insure a stable assembly and yet permit sufficient movement between the parts whereby to assist the wiping head of the wiper to yield or pivot as it begins each stroke of the wiping operation.

The parts are so constructed and arranged that the holder or support and wiper element will function to maintain the entire wiping edge or edges of the element in proper wiping contact or engagement with the surface to be cleaned. Such an arrangement requires that the support be yieldable in one plane yet sufficiently rigid in a plane transverse thereto to assure smooth operation of the device. These factors are important in order that the wiping element may automatically adjust itself to substantially any windshield surface that might be employed to advantage in the automotive industry. Of further importance is the fact that the degree of curvature of the windshield and the length of the wiping element must both be considered in determing the arrangement and construction of the complete wiper blade assembly as herein described.

The connection means 21, shown in detail in Figure 3, is unique in character and, among other things, includes a base wall 26 and widened side walls 27 of the bridge means, which walls are preferably notched to provide an opening 28 for the reception of an entering part in the form of a cross pivot 29, carried by a fitting 30, attached to the outer extremity of the wiper arm 1. A spring latch is housed substantially within the confines of the walls just referred to and is pivoted at 31 and serves to obstruct the opening 28 for the purpose of detachably holding the cross pivot 29 to connect the complete wiper assembly to the arm. The latch may be constructed as desired but is preferably of channel shape and includes a base strike portion 32, side walls 33, and finger portions 34 extending outwardly from the side walls for manual engagement.

The spring 35 of the latch is generally U-shaped in character and includes a pair of legs 36 and 37 joined together by a bight or loop portion 38. The spring 35 prior to being assembled with the latch, normally assumes an expanded position as illustrated by the dotted lines in Figure 3. After the latch has been secured in place on pivot 31, the spring is contracted and inserted into the latch to the illustrated full line position so that the leg 37 bears against inturned portions 39 formed of the side walls 27 of the bridge means, and the leg 36 engages the base strike portion 32 of the latch to normally urge and maintain such strike portion against the base wall 26 of the bridge to block the opening 28.

Attention is directed to the fact that the bight portion 38 of the spring is of such a size that the same can be snapped into holding relation with the pivot 31 and due to the fact that the legs of the spring are normally maintained in a contracted state or condition, the bight portion is firmly held in the desired position for influencing the operation of the latch. It will also be noted that the end of the leg 36 is preferably curved as indicated at 40 so as to assist in passing the leg 36 into the space between the pivot 31 and strike portion 32 as well as reduce the friction when the strike portion of the latch slidably engages the curved portion 40. Attention is also directed to the fact that the inner marginal edges 41 of the side walls 33 of the latch are positioned at an angle with reference to the strike portion so that if for any reason the wiper assembly and arm tend to become separated, the cross pivot 29 will engage the edges 41 and since the strike portion is backed against the base wall of the bridge, there is no chance for such parts to be disconnected.

To assemble the entering or cross pivot 29 with the connection means, the entering part is pressed against the strike portion of the latch which yields and then snaps back into the full line position illustrated when the entering part is seated in the opening. To disconnect the parts it is merely necessary to manually engage the finger portions 34 to pivot the latch so that the strike portion will clear the opening 28, whereupon the entering part may be removed. It is important to note that the connection means is so constructed and arranged that it does not increase the overall width of the complete wiper assembly, thereby minimizing its obstruction to vision. Attention is further directed to the fact that the extremities of the bridge provide a support for the connection means so that the connection means may rock about the longitudinal axis of the support, such rocking resulting in part from the loose fits between the ends of the support and the links.

In view of the foregoing description, it will be evident that the invention includes improved wiper means and a support therefor, which are associated or connected together in a manner whereby they may flex or yield while traveling over and wiping a concave or convex surface or combination of such surfaces, as well as for superior wiping operation against a substantially planar surface to be cleaned.

Also, the invention constitutes a notable advance in the design and construction of windshield wiper apparatus by the provision of a carriage or linkage assembly which serves to distribute to the wiper element the pressure exerted by the wiper arm so that the entire or full length of the wiping edge or edges of such element are applied uniformly to the glass to obtain the "hugging" action necessary to a clean wipe.

It will also be manifest that improved operative connections have been provided between the carriage assembly and the support for the wiping element.

Moreover, it will be apparent that unique means have been provided whereby when the original wiper unit becomes worn or damaged, it may be easily removed and replaced by a new unit, this effecting an appreciable saving to the car owner and a conservation of labor and material.

Having thus described my invention, it is obvious that various modifications may be made in the same without departing from the spirit of the invention; and, therefore, I do not wish to be understood as limiting myself to the exact form, construction, arrangement, and combination of parts herein shown and described.

I claim:

1. A windshield cleaner comprising a resiliently flexible squeegee unit conformable to a surface to be wiped, a pressure distributing holder unit having relatively movable parts engaged with the squeegee unit for distributing an arm applied pressure to said unit, said holder unit comprising a pair of connected yokes having their opposite ends individually resiliently supported on the squeegee unit at points spaced longitudinally along the unit for conforming the latter to the surface to be wiped, and means movable on one of the units and engageable with the other unit for detachably holding the units assembled.

2. A wiper blade comprising an elongated substantially continuous uniformly flexible stay means, a resilient wiper element carried by said stay means, an elongated bridge, a yoke connected to one extremity of the bridge, means for attaching the other extremity of the bridge to the blade, and means for holding the ends of the yoke in engagement with the wiper element, said resilient wiper element being arranged to act on said holding means for influencing its holding action and maintaining the yoke assembled with the blade.

3. In a windshield wiper assembly, an elongated wiper blade freely flexible in a single plane, a resilient means carried by said blade, elongated pressure distributing means arranged lengthwise in relation to the wiper blade and having at least three longitudinally spaced portions supported on said resilient means, and abutment means for maintaining the blade and pressure means assembled, said abutment means being movable whereby to permit complete separation of said blade from said pressure distributing means.

4. In a windshield wiper assembly a wiping subassembly comprising a resilient wiping element having one of its edges adapted to contact a surface of a windshield and a substantially uniformly flexible member attached to said wiping element adjacent its opposite edge for movement in unison therewith, a pressure-distributing subassembly consisting of a plurality of pivotally associated members constructed and arranged to apply pressure to said wiping subassembly at longitudinally spaced points thereon by means of contacting portions of said pressure-distributing subassembly arranged to slide directly upon said wiping subassembly and to be held in operative position thereon by movable means associated with one of said subassemblies.

5. A windshield cleaner, comprising; a continuous squeegee device resiliently flexible for movement in a direction perpendicular to a surface to be wiped, a pressure distributing device operatively connected to the squeegee device at at least three longitudinally spaced locations, and means carried by one of said devices for movement lengthwise thereof to enable separation of the devices.

6. A windshield wiper blade, comprising; an elongated resilient wiper means and elongated continuous resiliently flexible means, one of said means being provided with receiving means and the other of said means with portions seated in the receiving means for supporting the wiper means, said flexible means being flexible in a plane substantially perpendicular to a surface to be wiped and being substantially inflexible in a plane at right angles to said first-mentioned plane, and movable means for detachably holding the said portions in said receiving means.

7. An elongated windshield wiper blade assembly flexible in a single plane and comprising a resilient wiper element, a pair of members straddling said element and providing a support therefor, and means engaging said members for maintaining said members and element assembled, said means being influenced by the resiliency of said element for holding said means in place.

8. A windshield wiper blade comprising an elongated resilient wiper element and elongated substantially uniformly resiliently flexible means engaging and supporting the element substantially throughout its length for limiting movement thereof to a direction substantially perpendicular to a surface to be wiped, and means carried by the blade for detachably holding the element and flexible means assembled.

9. A windshield wiper blade comprising an integral elongated resilient wiper element having an attaching portion and a wiper portion oscillatable with respect to the attaching portion, elongated resiliently flexible means cooperating with the attaching portion for supporting the element for movement only in a direction substantially perpendicular to a surface to be wiped, and means mounted exteriorly on the blade for releasably holding the flexible means and attaching portion of the wiper element in said cooperative relationship.

10. A windshield cleaner comprising a continuous squeegee device resiliently flexible for movement in a direction perpendicular to a surface to be wiped, a pressure distributing device operatively connected to the squeegee device at at least three longitudinally spaced locations, and means while carried by one of said devices being movable to enable separation of the devices.

11. In a windshield wiper assembly, an elongated wiper blade assembly, said blade assembly comprising a resilient wiper element and resiliently flexible means of a predetermined thickness and width for supporting the element and restricting the blade assembly for substantially free flexing movement in a single plane, said wiper element having a wiping edge centrally disposed intermediate the width of said supporting means, a pressure-distributing assembly having longitudinally spaced portions supported on the wiper element, and means on one of said assemblies for detachably holding the spaced portions on the wiper element.

12. A windshield cleaner comprising a flexible squeegee unit conformable to the surface being wiped, a pressure distributing holder having relatively movable parts engaged with the squeegee unit for distributing an arm applied pressure to said unit, said holder comprising a primary yoke and plural secondary yokes pivotally mounted on the opposite ends of the primary yoke, said secondary yokes being mounted for relative movement, and means slidable on the squeegee unit for detachably connecting the secondary yokes thereto.

References Cited in the file of this patent

UNITED STATES PATENTS

| | | |
|---|---|---|
| 1,463,590 | Pederson | July 31, 1923 |
| 1,771,824 | Storrie | July 29, 1930 |
| 1,953,635 | Rose | Apr. 3, 1934 |
| 2,087,178 | Zaiger | July 13, 1937 |
| 2,149,037 | Zaiger | Feb. 28, 1939 |
| 2,254,343 | Zierer | Sept. 2, 1941 |
| 2,265,551 | Steconne | Dec. 9, 1941 |
| 2,274,277 | Rousseau | Feb. 24, 1942 |
| 2,303,694 | Horton | Dec. 1, 1942 |
| 2,543,383 | Scinta et al. | Feb. 27, 1951 |
| 2,649,605 | Scinta et al. | Aug. 25, 1953 |
| 2,659,097 | Morton | Nov. 17, 1953 |

FOREIGN PATENTS

| | | |
|---|---|---|
| 427,383 | Great Britain | Apr. 23, 1935 |
| 433,467 | Great Britain | Aug. 15, 1935 |
| 820,156 | France | July 26, 1937 |